E. Snell.
Anchor.
N°49,688. Patented Aug. 29, 1865.
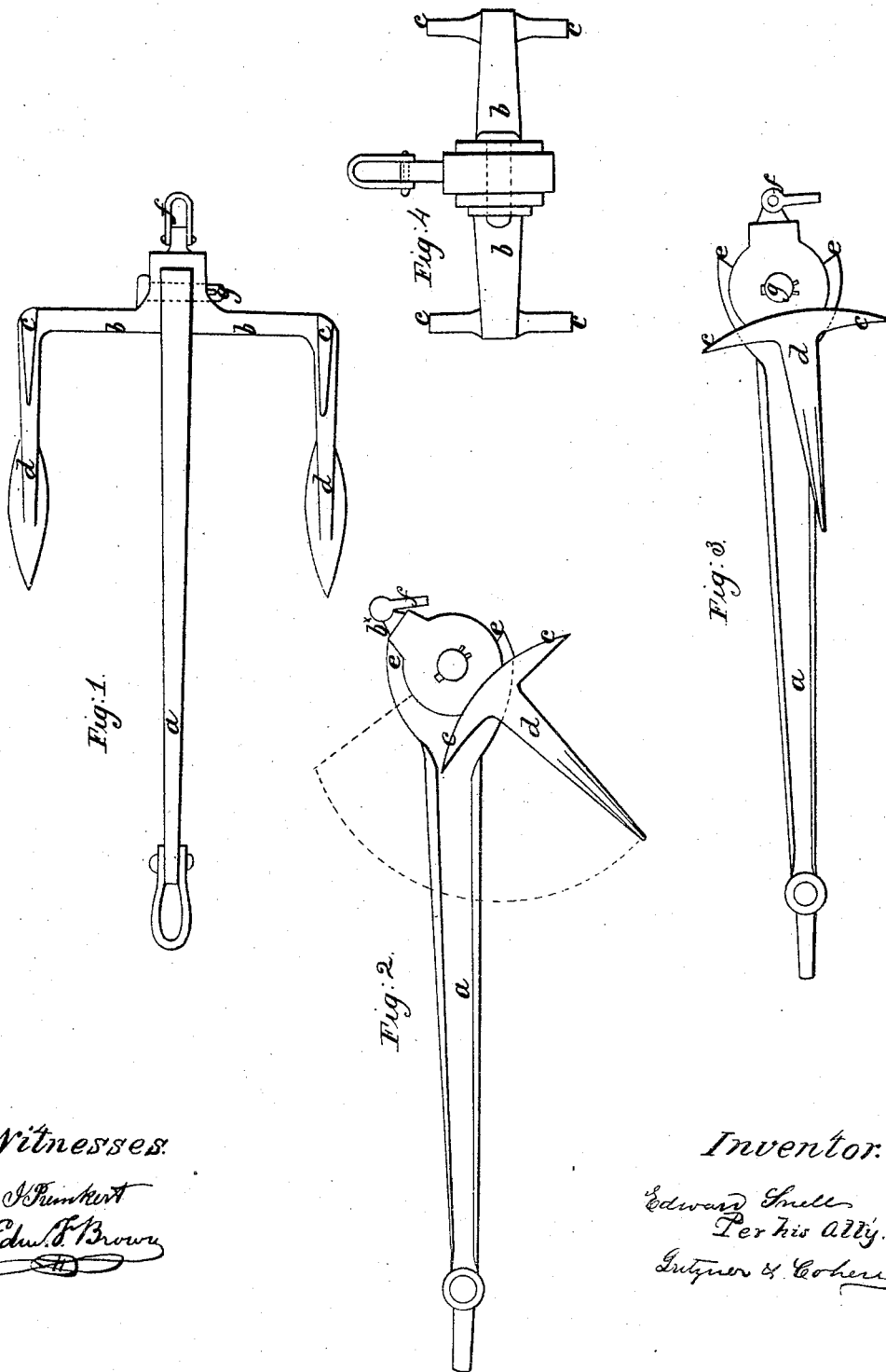
Witnesses
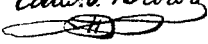
Inventor:
Edward Snell
Per his Att'y.
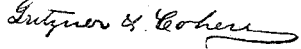

UNITED STATES PATENT OFFICE.

EDWARD SNELL, OF 31 CHARING CROSS, COUNTY OF MIDDLESEX, KINGDOM OF GREAT BRITAIN.

IMPROVED ANCHOR.

Specification forming part of Letters Patent No. 49,688, dated August 29, 1865.

*To all whom it may concern:*

Be it known that I, EDWARD SNELL, of 31 Charing Cross, county of Middlesex, England, have invented an Improved Anchor, of which the following is a specification.

My invention of improvements in the construction of anchors has for its object to give greater holding-power than heretofore, and also to dispense with the ordinary cross-stock or sector of anchors, so that the anchor, when not in use, may be stowed away more conveniently than anchors of the ordinary kind.

By the peculiar mode of constructing the anchor the palms will be made to catch against and enter the ground with greater certainty than heretofore, and will hold with greater tenacity.

In carrying out my invention the cross-arms which carry the palms extend on each side of the shank, and the central part of the said cross-arms is cut out, forged, or slotted, so as to receive an eye at the end of the shank. This eye is made of great strength, and the arms are connected to it by a strong pin, which passes through but allows the arms to turn on it as on a center. The arms are bent round into a position parallel with the shank, which is formed with two projecting shoulders or blocks, against which corresponding shoulders on the central part of the cross-arms are made to bear when the palms are holding in the ground. The arms are also provided on each side, near the angle or bent part, with a pair of projecting horns, one horn being on each side of each of the arms, so that in whichever way the anchor may be dropped onto the ground two of the horns will rest thereon and cause the ends of the palms to be pointed downward, so as to insure their catching into and holding in the ground. The slotted or central part of the arms is provided with a shackle or ring, to which is attached a buoy-rope, whereby the palms of the anchor may be drawn out backward when the anchor, from catching in rocks, sunken wreck, ships' moorings, or other obstructions, cannot be weighted in the usual manner.

In the accompanying drawings, Figure 1 represents one of my double-grip anchors in plan as it would be on the ground before the palms enter the ground. $a$ is the shank; $b\ b$, the arms; $c\ c$, the horns which catch against the ground and turn the palms $d\ d$ into the ground.

Fig. 2 represents the anchor in side elevation, and showing the palms $d$ as having turned down and entered the ground until the end or shoulder of the slotted joint $b^*$ is brought up by the stop $e$ at the end of the shank. The same result would ensue had the anchor fallen on the reverse side.

Fig. 3 is a side elevation representing the anchor with the parts in an inoperative state, or as they would be when the anchor is lying on the ship's deck or out of use. This figure also shows the position of the horns $c\ c$ on the arms $b\ b$, and the manner in which the horns direct the palms or ends of the arms $b\ b$ into the ground. $f$ is a small shackle, to which the buoy-rope is attached.

Fig. 4 is a cross-section taken through the slotted eye of the arms $b\ b$, and showing the center-pin $g$, on which the arms turn and whereby they are connected with the shank $a$ of the anchor.

It will be seen on referring to the drawings that whichever way the anchor falls onto the ground the two points of the horns $c\ c$ must rest thereon, and upon any strain being put upon the shank $a$ having a tendency to draw the anchor along the bottom, the horns will catch in the ground and turn the palms or points of the arms downward, as indicated by the dotted lines, until the arms are brought into the position shown in Fig. 2, when the side or shoulder of the slotted eye or joint $b^*$ will be brought against the shoulder or stop $e$ of the shank, and the arms will be prevented from turning down any farther. It will be seen that by this arrangement or construction of parts the anchor is not liable to foul; that a ship is not liable to injure her bottom by grounding on her anchor; that the anchor has double the holding power of an ordinary anchor of the same weight, and that no sector or cross-stock will be necessary. Consequently the anchor will require much less room for storage than an anchor of the ordinary construction, and great facility is given for withdrawing the anchor from foul ground, sunken wreck, ships' moorings, or other obstructions, as such withdrawal of the anchor may be effected by underrunning the cable, there being no stock to prevent the rope from reaching the arms, or by hauling on the buoy-rope, and thus drawing the anchor out backward.

Having now described my invention of improvements in the construction of anchors, and having explained the manner of carrying the same into effect, I claim as the invention secured to me by Letters Patent as aforesaid—

The adaptation to the movable arms of double-grip anchors of four horns, which cause the anchor to lie on the ground in the right position and compel the palms or ends of the arms to enter or penetrate the ground and take hold at once, the dispensing with a stock or sector, great holding power, lightness, facility of stowage, non-liability to foul, and facility of withdrawal from foul ground or obstructions, as herein set forth.

London, 13th January, 1865.

EDW. SNELL.

Witnesses:
G. F. WARREN,
F. W. HAWS,
Both of No. 17 Gracechurch Street, London, E.C.